Patented Dec. 10, 1946

2,412,510

UNITED STATES PATENT OFFICE 2,412,510

METHODS AND COMPOSITIONS FOR KILLING WEEDS

Franklin D. Jones, Llanerch, Pa., assignor to American Chemical Paint Company, Ambler, Pa., a corporation of Delaware No Drawing. Application June 21, 1945, Serial No. 600,841. In Canada June 2, 1944

22 Claims. (Cl. 167—45)

The present invention relates to methods and compositions for killing growing weeds.

The term "weed" is used in the present disclosure in its broadest sense, namely, a plant which persists in growing where it is not wanted. This use of the term is broad enough to include not only plants harmful to man or animal, such as those of the Rhus family (poison ivy and poison oak), bindweed, and plants such as wild garlic and French weed, which have a bad effect on dairy products, but also otherwise desirable plants such as Japanese honey suckle or lawn grasses growing on driveways.

Weeds, as a general rule, are able to grow under adverse conditions and their control presents a very difficult and troublesome problem to farmers. Prior to the research which resulted in the present invention, the most effective methods involved the use of chemicals such as common salt, chlorates, iron sulphate, ammonium sulphate, carbon disulphide, ammonium sulfamate, sodium dinitro-ortho-cresylate, sodium arsenite, and oil. All of these materials are low in unit cost, but high in cost per acre when applied in sufficient quantities to kill the weeds and they may sterilize the soil for long periods. Moreover, many of them are hazardous, being poisonous or explosive, or both. Most of them are corrosive to the equipment and difficult to handle. Moreover, they tend to kill the top of the plant without killing the roots permanently.

The primary object of the invention is to improve chemical methods for eradicating weeds in an active state of growth.

Another object of importance is to provide a wholly new class of systemic or translocated herbicides.

Another important object is to provide compositions for the purpose of eradicating growing weeds, which are considerably less expensive, more economical, safer to use, and more effective than previously used chemicals.

The invention is based in part upon the observation or discovery that certain compounds, which will hereinafter be referred to as "compounds of the invention" at certain concentrations, are systemic poisons for higher plant life, and may be used as the active ingredients of herbicides.

The compounds of the invention are the amides and the thioamides of the phenyl, phenoxy, phenylmercapto, phenylimino, naphthyl, naphthoxy, naphthylmercapto, naphthylimino, and anthracyl, monocarboxylic aliphatic acids.

The term "aliphatic acids" is broad enough to include both the saturated and unsaturated acids. For practical reasons, acids having one to nine carbon atoms are preferred, but the invention is not restricted thereto. As examples of suitable acids may be mentioned formic, acetic, propionic, butyric, valeric, hexoic, acrylic, methyl acrylic, etc.

As examples of compounds, which have been found particularly suitable for the purposes of this invention may be mentioned the amides and thioamides of the following acids:

Benzoic acid (phenyl formic acid), its halogen and nitro substitution products such as 2.4-dichloro-benzoic acid, 2.5-dichloro-benzoic acid, 3.5-dichloro-benzoic acid, 2.3.5-triiodo benzoic acid, 2-chloro-5-nitro-benzoic acid, and 2-bromo-3-nitrobenzoic acid.

Phenyl acetic acid, its halogen substitution products such as 2-chloro-phenyl acetic acid, 4-chloro-phenyl acetic acid, 4-bromo-phenyl acetic acid, and 4-iodo-phenyl acetic acid.

Phenyl alpha and gamma butyric acids, and their various derivatives, particularly 4-chlorophenyl alpha and gamma butyric acids.

Phenoxyacetic acid, its alkyl substitution products such as 4-methyl phenoxyacetic acid, 2.4-dimethyl phenoxyacetic acid, 3.4-dimethyl phenoxyacetic acid, 3.5-dimethyl phenoxyacetic acid, and 2.4.5-trimethyl phenoxyacetic acid, its alkoxy derivatives such as 4-methoxy phenoxyacetic acid, its halogen substitution products such as 2-chloro-phenoxyacetic acid, 4-chloro-phenoxyacetic acid, 2.4-dichloro-phenoxyacetic acid, 2.4.5-trichloro-phenoxyacetic acid, 2.4.6-trichloro-phenoxyacetic acid, 2.3.4.6-tetrachloro-phenoxyacetic acid, pentachloro-phenoxyacetic acid, 4-bromo-phenoxyacetic acid, 2.4-dibromo-phenoxyacetic acid, 2.4.6-tribromophenoxyacetic acid, 4-iodo-phenoxyacetic acid, 4-fluoro-phenoxyacetic acid and 2.4-difluoro-phenoxyacetic acid, and its nitro-substitution products such as 4-nitro-phenoxyacetic acid. As additional examples of suitable derivatives of phenoxyacetic acid may be mentioned 3-methyl-4-chloro-phenoxyacetamide, 2-methyl-4-chloro-phenoxyacetamide and the corresponding thioamides.

Phenylimino-acetic acid (phenyl glycine) and phenylmercapto-acetic acid, and their halogenated products such as 2.4-dichloro-phenylimino-acetic acid, 4-chloro-phenylmercapto-acetic acid, and 2.4-dichloro-phenyl-mercapto-acetic acid.

Naphthalene-1-acetic acid, its alkyl substitution products such as 2-methyl-naphthyl-1-acetic acid and 4-methyl-naphthyl-1-acetic acid, the halogen substitution products such as 4-chloro-naphthyl-1-acetic acid, and the nitro-substitution derivatives such as 4-nitro-naphthyl-1-acetic acid.

1-naphthalene-alpha-propionic acid, 1-naphthalene-beta-propionic acid, 1-naphthalene-gamma-butyric acid, and their halogen substitution products.

1-naphthoic acid, 2-naphthoic acid, and the halogen substitution products.

1-naphthoxyacetic acid, 2-naphthoxyacetic acid, 1-naphthoxy-alpha-propionic acid, 2-naphthoxy-alpha-propionic acid, and their halogen substitution products such as 2-chloro-1-naphthoxyacetic acid and 2.4-dichloro-1-naphthoxyacetic acid.

The naphthyl glycines, e. g. 1-naphthyliminoacetic acid and 2-naphthylimino-acetic acid, and their halogen substitution products such as 4-chloro-1-naphthylimino-acetic acid.

1-naphthylmercapto-acetic acid and 2-naphthylmercapto-acetic acid, their halogen substitution products, and the esters and salts.

Tetralyl-6-acetic acid.

Anthracyl-acetic acid, and its halogen substitution products.

The foregoing list is given by way of illustration only, and the corresponding derivatives of the corresponding unsaturated acids, e. g. acrylic acid and its homologues, may be used.

Some, but not all of the foregoing compounds, are plant hormones; i. e. they serve to promote plant growth, when used in very minute concentrations in the form of solutions or dusts, or in considerably higher concentrations in the form of pastes in such materials as fats or greases (e. g. lanolin). For the purposes of the present invention, the aforementioned compounds, whether or not they are plant hormones, must be used in much higher concentrations than have ever been used for plant growth promotion. The minimum effective concentration depends upon a number of factors such as, for instance, the particular species of plant to be eradicated, the particular type of vehicle or medium, and whether or not an adjuvant is used. There is no upper limit to the concentration, except that dictated by economy.

If the active herbicidal ingredient is used in an aqueous medium without an adjuvant having penetrating properties, the lower effective limit appears to be about .05%. If an adjuvant is used, e. g. the wetting, dispersing or emulsifying agents to be mentioned, the lower limit appears to be in the neighborhood of .02%. I prefer to use at least .1% concentration, whether or not an adjuvant is employed. If the compound is used in the form of dusts, I prefer to use concentrations of .2% or over. Considerably higher concentrations are generally required, if the compounds are applied in the form of pastes, mists or aerosols.

It is to be noted at this point that the effectiveness of the compounds of the invention appears to be due in large measure to the fact that they have the property of being able to penetrate into the conducting tissue of the plant, being carried deep into the roots, killing the plant throughout. It is well known that in order for a herbicide to be fully effective, the herbicide must kill the roots as well as the top of the plant.

The compounds of the invention, therefore, appear to fit the definition of "translocated" or "systemic" herbicides. For they do not merely injure the weed at the point of contact; they take the normal path from leaves to roots within the plant and destroy it from within.

Most of the compounds of the invention are practically insoluble in water as far as usual standards of solubility are concerned. One of the problems solved by the present invention was to find a way for getting the insoluble compounds of the invention into solution or suspension, so as to render it possible to bring the necessary concentration to bear on the plant tissue.

The present invention is based in part upon the observation or discovery that wetting, dispersing and emulsifying agents in general will dissolve or suspend from 1 to 50% of their weight of the compounds of the invention and that when such solutions or suspensions are mixed with water in any proportion, a relatively stable colloidal suspension or solution is formed.

In this connection, it should be noted that generally speaking it is not possible to produce stable solutions of the water-insoluble compounds of the invention by dissolving in organic solvents those compounds that happen to be soluble in such solvents, and then diluting with water. For the addition of water ordinarily precipitates the compounds.

This invention is not limited in its broad aspects to any particular wetting, dispersing or emulsifying agent. See, for instance "A List of Commercially Available Detergents, Wetting, Dispersing and Emulsifying Agents" by H. L. Cupples, Division of Insecticide Investigations of the United States Department of Agriculture published June, 1940, and chapter 11 on "Emulsions" of Mattiello's "Protective and Decorative Coatings," vol. IV, John Wiley & Sons, Inc., New York, 1944. Nor is the invention in its broad aspects limited to agents of either the ionic or non-ionic type, though I do prefer to use those of the non-ionic type.

Agents of the non-ionic type are those that are not affected by salts, acids, or bases, whereas those of the ionic type are affected to the extent that precipitation may occur when a salt, acid or base is added to a solution or suspension of a compound in an ionic agent.

Sulphonated vegetable oils (e. g. sulphonated castor oil, corn oil, peanut oil, soy bean oil, etc.) are examples of ionic agents that I may use. These have the advantage of cheapness, but being ionic, they have their limitations when used in the presence of acids, bases and salts. When such agents are used, it is advisable to use distilled or soft water for dilution purposes.

As previously stated, agents of the non-ionic type are preferred. This type of agent will usually dissolve or suspend from 1 to 50% of its volume or weight of the compounds of the invention, and may then be diluted with water to the desired concentration for application to the plant. The usual amounts of salts, acids, or alkalis apparently have little, if any, effect on the resulting solution or suspension.

A class of non-ionic agents that I have found particularly suitable for the purposes of this invention may be defined as follows:

"A water-soluble, non-ionic emulsifying agent containing polyether groups of the formula R. O. $(C_2H_4O)_n.R_1$, where R is an alkyl, aryl, aralkyl, alkyl-aryl or acyl group of 10 carbon atoms or more, and $R_1$ is an alkyl, aryl, aralkyl, alkyl-aryl, or acyl group or a hydrogen atom, and $n$ is an integer greater than 2 and generally greater than 10."

Two commercial products answering to the foregoing description, which have been used in practicing the invention, are Tween #20 made by Atlas Powder Company, Wilmington, Delaware, and Triton NE made by Rohm and Haas Co., Philadelphia, Pennsylvania. Tween is a polyoxyalkylene derivative of sorbitan monolauric, and Triton NE is a polyalkylene ether alcohol.

Similarly useful are the polyethylene glycols of molecular weight of 1500 or more, obtainable on the market under the trade-mark Carbowax.

The following are several illustrative examples of herbicidal compositions made according to the teachings of the present invention:

Example I

| | Parts |
|---|---|
| Phenylacetamide | 5 |
| Butyl alcohol | 5 |
| Tween #20 or Triton NE | 50 |

The three ingredients are thoroughly mixed to produce a stock solution. The solution may be diluted with 940 parts of water when it is to be used.

Example II

Naphthylthioacetamide or 2.4-dichlorophenoxyacetamide is used instead of the phenylacetamide of Example I.

Example III

B-naphthoxyacetamide is substituted for the phenylacetamide of Example I.

Example IV

| | Parts |
|---|---|
| 1-naphthylacetamide | 2 |
| Levulinic acid | 20 |
| Tween #20 | 20 |

The three ingredients are mixed together to form a solution, and finally diluted with 958 parts of water.

The levulinic acid serves not only as a mutual solvent but also as an acidifying agent.

Example V

| | Parts |
|---|---|
| 2.4.5-trichlorophenoxyacetamide | 2 |
| Carbitol | 20 |
| Sulphonated castor oil | 100 |
| Water | 878 |

First the amide is dissolved in the carbitol and the sulphonated castor oil, and the solution is then mixed with the water.

Example VI

B-naphthoxy-alpha-propionamide may be substituted for the 2.4.5-trichlorophenoxyacetamide of Example V.

Example VII

P-chlorophenoxyacetamide may be substituted for the phenylacetamide of Example I.

Example VIII

| | Parts |
|---|---|
| 4-nitro-naphthyl-1-acetamide | 2 |
| Carbitol | 20 |
| Sulphonated corn oil | 100 |
| Sodium lauryl sulphate | 5 |
| Water | 873 |

The amide is first dissolved in the carbitol, then mixed with the oil and sodium lauryl sulphate, and then with the water.

Example IX 1-naphthyliminoacetamide may be substituted for the 4-nitro-naphthyl-1-acetamide of Example VIII.

It is noted that in certain of the examples, citric acid was added. The purpose is to lower the pH, as it has been found that plants take up such chemicals much more readily at a pH of 4 or less. Any acid may be used, but solid acids as tartaric, succinic, citric, malic, maleic, sulfamic and fumaric are generally more convenient to use for this purpose than the liquid acids. The acid may be added at any time before using the composition, but it preferably forms part of the stock solution.

The compounds of the invention may also be incorporated into dry compositions containing other active or inactive ingredients. For instance, a suitable dry composition may contain any one or more of the compounds of the invention, a wetting agent in dry form such as Alkanol (sodium tetrahydronaphthalenesulphonate or sodium alkylnaphthalenesulphonate), and an acidifying agent, such as citric, tartaric, succinic, malic, maleic, fumaric and sulfamic acid. The purpose of the acid is to reduce the pH to 4 or less, at which pH the herbicidal compositions are more readily absorbed by the plant. An acid, either solid or liquid, may also be added to the wet compositions. It is advantageous in many cases to add a buffer salt (a salt of any weak acid or base), particularly if the composition contains sulfamic acid.

The following are a few examples of dry compositions suitable for killing weeds:

Example X

| | Parts |
|---|---|
| Any amide or thioamide of the invention | 1 |
| Aerosol (American Cyanamid & Chemical Corp., New York), or Santomerse (Monsanto Chemical Co., St. Louis, Missouri) | 1 |
| Talc | 98 |

Example XI

| | Parts |
|---|---|
| Any amide or thioamide of the invention | 2 |
| Oil (light motor grade) | 3 |
| Talc | 95 |

The ingredients in each of the foregoing examples are thoroughly ground together in a pebble mill. The resulting compositions are intended to be applied to the leaves of the weeds in the form of dusts.

The compositions of the invention lend themselves particularly to application to weeds in the form of fine mists or aerosols. If they are to be applied in this manner, they should be dissolved in a very volatile solvent such as fluorinated hydrocarbons such as tetrafluormethane, halogenated hydrocarbons containing both chlorine and fluorine such as dichlorodifluoromethane (Freon), or dimethyl ether.

The following are a few examples of compounds suitable for application in the form of mists or aerosols.

Example XII

| | Per cent |
|---|---|
| Any compound of invention | 1 |
| Dimethyl ether | 90 |
| Mutual solvent such as cyclohexanone | 9 |

Example XIII

| | Per cent |
|---|---|
| Any compound of invention | 1 |
| Freon | 89 |
| Mutual solvent | 10 |

The compositions made in accordance with the invention may be applied for their intended purpose in several different ways.

The most advantageous and presently preferred way is to spray the composition on the leaves of the plant to be exterminated. This method takes advantage of the normal path taken by naturally-occurring hormones.

Another method is to cut off the top of the stem of the plant, and then bend the stem over into a solution of the herbicide. The plant absorbs sufficient herbicide in this manner to kill itself.

I am not precluded from using the herbicides of the invention in other ways, as by applying them to the roots.

At this point, it is to be noted that the effectiveness of a herbicide can be considerably increased by applying it on a sunny day when the temperature is over 70° F.

It is also to be noted that the compositions of the invention have an accumulative effect on plants, so that by spraying a plant with a composition of half strength on two occasions, two or three weeks apart, the plant will be killed, though the first application itself is not sufficient.

The compositions of this invention are much more effective than previously-used chemicals, and are capable of killing weeds, which are noxious, insidious and persistent like poison ivy in a period of two to three weeks. They can be applied to large areas at relatively small expense and have the added advantage that unlike prior herbicides they do not render the area sterile. Furthermore, they are not harmful to either man or beast, and can be readily handled without any danger.

In conclusion, it is to be understood that the examples have been given for illustrative purposes only, and that the invention is not to be limited thereto.

This application is a continuation-in-part of my prior application Serial No. 529,171 filed April 1, 1944.

I claim:

1. A method for killing weeds in an active state of growth, which consists in applying to the weeds a substance selected from the group consisting of the amides and thioamides of phenyl, phenoxy, phenylmercapto, phenylimino, naphthyl, naphthoxy, naphthylmercapto, naphthylimino, and anthracyl, monocarboxylic aliphatic acids, in a concentration of at least about .05% by weight.

2. A method for killing weeds in an active state of growth, which consists in applying to the leaves of the weeds a substance selected from the group consisting of the amides and thioamides of phenyl, phenoxy, phenylmercapto, phenylimino, naphthyl, naphthoxy, naphthylmercapto, naphthylimino, and anthracyl, monocarboxylic aliphatic acids, in a concentration of at least about .05% by weight.

3. A method for killing weeds in an active state of growth, which consists in applying to the leaves of the weeds an aqueous solution of a substance selected from the group consisting of the amides and thioamides of phenyl, phenoxy, phenylmercapto, phenylimino, naphthyl, naphthoxy, naphthylmercapto, naphthylimino, and anthracyl, monocarboxylic aliphatic acids, in a concentration of at least about .05% by weight.

4. A method for killing weeds in an active state of growth, which consists in applying to the leaves of the weeds a composition containing an active ingredient, water and a wetting, dispersing and emulsifying agent, said active ingredient being selected from the group consisting of the amides and thioamides of phenyl, phenoxy, phenylmercapto, phenylimino, naphthyl, naphthoxy, naphthylmercapto, naphthylimino, and anthracyl, monocarboxylic acids, in a concentration of at least .02% by weight.

5. A method for killing weeds in an active state of growth, which consists in applying to the leaves of the weeds a composition containing an active ingredient, water and a water-soluble, non-ionic wetting, dispersing and emulsifying agent, said active ingredient being selected from the group consisting of the amides and thioamides of phenyl, phenoxy, phenylmercapto, phenylimino, naphthyl, naphthoxy, naphthylmercapto, naphthylimino, and anthracyl, monocarboxylic aliphatic acids, and comprising at least about .02% of said composition.

6. A method for killing weeds in an active state of growth, which consists in applying to the leaves of the weeds a composition containing a substance selected from the group consisting of the amides and thioamides of phenyl, phenoxy, phenylmercapto, phenylimino, naphthyl, naphthoxy, naphthylmercapto, naphthylimino, and anthracyl, monocarboxylic aliphatic acids, and comprising at least about .02% of the weight of the composition, water and a water-soluble, nonionic emulsifying agent containing polyether groups of the formula $R.O.(C_2H_4O)_n.R_1$, where $R$ is an alkyl, aryl, aralkyl, alkyl-aryl, or acyl group of at least 10 carbon atoms, and $R_1$ is an alkyl, aryl, aralkyl, alkyl-aryl or acyl group or a hydrogen atom, and $n$ is an integer greater than 2.

7. A method for killing weeds in an active state of growth, which consists in applying to the leaves of the weeds a composition containing naphthylacetamide and a wetting, dispersing and emulsifying agent, the naphthylacetamide comprising at least about .02% of the composition.

8. A method for killing weeds in an active state of growth, which consists in applying to the leaves of the weeds a composition containing naphthylacetamide, water and a water-soluble non-ionic wetting, dispersing and emulsifying agent, the naphthylacetamide comprising at least about .02% of the composition.

9. A method for killing weeds in an active state of growth, which consists in applying to the leaves of the weeds a composition containing 2.4-dichlorophenoxyacetamide, and a wetting, dispersing and emulsifying agent, the 2.4-dichlorophenoxyacetamide comprising at least about .02% of the composition.

10. A method for killing weeds in an active state of growth, which consists in applying to the leaves of the weeds a composition containing 2.4-dichlorophenoxyacetamide, water and a water-soluble non-ionic wetting, dispersing and emulsifying agent the 2.4-dichlorophenoxyacetamide comprising at least about .02% of the composition.

11. A method for killing weeds in an active state of growth, which consists in applying to the leaves of the weeds a composition containing 2.4.5-trichlorophenoxyacetamide, and a wetting, dispersing and emulsifying agent, the 2.4.5-trichlorophenoxyacetamide comprising at least about .02 of the composition.

12. A method for killing weeds in an active state of growth, which consists in applying to the leaves of the weeds a composition containing 2.4.5-trichlorophenoxyacetamide, water and a water-soluble non-ionic wetting, dispersing and emulsifying agent, the 2.4.5-trichlorophenoxyacetamide comprising at least about .02% of the composition.

13. A composition for killing weeds in an active state of growth, said composition containing an active ingredient, water and a wetting, dispersing and emulsifying agent, the active ingredient being selected from the group consisting of the amides and thioamides of phenyl, phenoxy, phenylmercapto, phenylimino, naphthyl, naphthoxy, naphthylmercapto, naphthylimino, and anthracyl, monocarboxylic aliphatic acids, and comprising at least about .02% by weight of said composition.

14. A composition for killing weeds in an active state of growth, said composition containing an active ingredient, water and a water-soluble, non-ionic wetting, dispersing and emulsifying agent, the active ingredient being selected from the group consisting of the amides and thioamides of phenyl, phenoxy, phenylmercapto, phenylimino, naphthyl, naphthoxy, naphthylmercapto, naphthylimino, and anthracyl, monocarboxylic aliphatic acids, and comprising at least about .02% by weight of said composition.

15. A composition for killing weeds in an active state of growth, said composition containing a substance selected from the group consisting of the amides and thioamides of phenyl, phenoxy, phenylmercapto, phenylimino, naphthyl, naphthoxy, naphthylmercapto, naphthylimino, and anthracyl, monocarboxylic aliphatic acids, and comprising at least about .02% of the weight of the composition, water and a water-soluble, nonionic emulsifying agent containing polyether groups of the formula $R.O.(C_2H_4O)_n.R_1$, where $R$ is an alkyl, aryl, aralkyl, alkyl-aryl, or acyl group of at least 10 carbon atoms, and $R_1$ is an alkyl, aryl, aralkyl, alkyl-aryl or acyl group or a hydrogen atom, and $n$ is an integer greater than 2.

16. A composition for killing weeds in an active state of growth, said composition containing an active ingredient, water and a wetting, dispersing and emulsifying agent, the active ingredient being naphthylacetamide, and comprising at least about .02% by weight of said composition.

17. A composition for killing weeds in an active state of growth, said composition containing an active ingredient, water and a wetting, dispersing and emulsifying agent, the active ingredient being 2.4-dichlorophenoxyacetamide, and comprising at least about .02% by weight of said composition.

18. A composition for killing weeds in an active state of growth, said composition containing an active ingredient, water and a wetting, dispersing and emulsifying agent, the active ingredient being 2.4.5-trichlorophenoxyacetamide, and comprising at least about .02% by weight of said composition.

19. A composition containing a substance selected from the group consisting of the amides and thioamides of phenyl, phenoxy, phenylmercapto, phenylimino, naphthyl, naphthoxy, naphthylmercapto, naphthylimino, and anthracyl, monocarboxylic aliphatic acids, mixed with a wetting, dispersing and emulsifying agent, and comprising at least one per cent of the composition, said composition being capable of being mixed with water to form a solution containing at least .02% by weight of said substance and having herbicidal properties.

20. A composition containing naphthylacetamide mixed with a wetting, dispersing and emulsifying agent and comprising at least one per cent of the composition, said composition being capable of being mixed with water to form a solution containing at least .02% by weight of said naphthylacetamide and having herbicidal properties.

21. A composition containing 2.4-dichlorophenoxyacetamide mixed with a wetting, dispersing and emulsifying agent and comprising at least one per cent of the composition, said composition being capable of being mixed with water to form a solution containing at least .02% by weight of said 2.4-dichlorophenoxyacetamide and having herbicidal properties.

22. A composition containing 2.4.5-trichlorophenoxyacetamide mixed with a wetting, dispersing and emulsifying agent and comprising at least one per cent of the composition, said composition being capable of being mixed with water to form a solution containing at least .02% by weight of said 2.4.5-trichlorophenoxyacetamide and having herbicidal properties.

FRANKLIN D. JONES.